United States Patent [19]
Shelton

[11] Patent Number: 5,595,109
[45] Date of Patent: Jan. 21, 1997

[54] FOOD STORAGE DEVICE WITH DEHUMIDIFICATION MEANS

[75] Inventor: Winston L. Shelton, Louisville, Ky.

[73] Assignee: Carton Drive Enterprises, Louisville, Ky.

[21] Appl. No.: 421,832

[22] Filed: Apr. 13, 1995

Related U.S. Application Data

[63] Continuation of Ser. No. 251,208, May 31, 1994.

[51] Int. Cl.$^6$ .............................. A21B 1/00; A21B 1/22; F27D 11/00
[52] U.S. Cl. ................... 99/476; 99/474; 99/331; 99/483; 126/21 A; 126/369; 219/401
[58] Field of Search .............................. 99/474, 473, 476, 99/475, 331, 483; 219/400, 401; 126/20, 21 A, 20.1, 20.2, 369, 348

[56] References Cited

U.S. PATENT DOCUMENTS

| | | |
|---|---|---|
| 2,526,974 | 10/1950 | Schipanski . |
| 4,281,636 | 8/1981 | Vegh et al. ............... 126/369 |
| 4,612,911 | 9/1986 | Onodera ................... 126/369 |
| 4,770,888 | 9/1988 | Loeb ........................ 426/520 |
| 4,782,214 | 11/1988 | Voegtlin ................... 219/401 |
| 4,939,987 | 7/1990 | Smith ........................ 99/468 |
| 4,984,557 | 1/1991 | König ....................... 126/21 A |
| 5,083,505 | 1/1992 | Kohlstrung et al. ...... 99/331 |
| 5,301,652 | 4/1994 | Willis et al. .............. 126/20 |

Primary Examiner—David Scherbel
Assistant Examiner—Reginald L. Alexander

[57] ABSTRACT

Thermalizing apparatus for food product which includes a food receiving chamber, a first heat source to heat the chamber, a reservoir to receive water located in communication with the chamber and a second heater located in the water reservoir to establish moisture vapor content in the food chamber.

The temperature of the air in the chamber and the temperature of the water in the reservoir are controlled to maintain selected conditions in the chamber by selectively supplying energy to the air heater and to the water heater. A controller is provided to allow selection of conditions appropriate for food in the chamber and maintain the air and water in the reservoir at selected temperatures to maintain the desired characteristics of the food in the chamber.

A condenser device is provided to maintain water and heat content in the chamber to prevent excessive moisture in the chamber and to maintain food texture and quality as freshly cooked, heated food is introduced to the chamber.

3 Claims, 3 Drawing Sheets

5,595,109

FOOD STORAGE DEVICE WITH DEHUMIDIFICATION MEANS

BACKGROUND OF THE INVENTION

This is a continuation of U.S. patent application Ser. No. 08/251,208 pending, filed May 31, 1994.

The present invention relates generally to processes and equipment for the storage and handling of food product after it has been prepared.

Examples of devices and procedures useful in the preparation and storage of foods in convection type ovens are shown and described in U.S. Pat. No. 4,770,888.

Dry type storage devices generally are in widespread use and have a chamber which is heated by various means and is provided with control means to maintain the temperature in the chamber within selected limits. In the use of dry type storage devices it is not generally recognized that storage of the food without consideration of the overall dynamics of the water cycle overlooks the benefits which can be achieved by use of the equilibrium water activity characteristics of the food.

In accordance with the principles of convection type storage devices water is introduced to the food storage chamber so that the moisture content in the chamber is maintained in relation to the equilibrium water activity of the food product and further, where the water content of the air in the chamber can be adjusted relative to the equilibrium water activity of the food being stored to achieve desired final characteristics of the food product.

A problem commonly encountered with storage devices is that the food begins deterioration almost immediately on introduction to the storage chamber because it begins to lose moisture since in most cases the temperature of the chamber must be higher than the equilibrium temperature to maintain the food in what would be perceived to be a heated condition. In such dry storage devices the quality of the food is directly affected by the time in storage.

No prior art references are known which teach or even remotely suggest the features and advantages provided by devices within the scope of the present invention.

SUMMARY OF THE INVENTION

The present invention provides a new and useful apparatus for holding food after preparation.

More particularly, the present invention provides features useful to enhance quality of the food stored in a chamber by utilizing the beneficial effects arising from interrelation of the temperature and water vapor content in cooking chamber with the equilibrium water activity of the food in process. In such an apparatus the water vapor content in the chamber is adjusted by setting the temperature in a water reservoir to provide water vapor to the chamber and the air temperature within the chamber to provide desired water partial pressure in the chamber.

It has been found that by selective adjustment of the air and water temperature during the storage the food can be caused to gain moisture, lose moisture or hold moisture as desired. In the use of convection type storage devices where the air is specifically treated to maintain selected moisture content it is important that the water content of the air be maintained carefully and that only the amount of water necessary to maintain the desired conditions be allowed to enter the air stream.

The water reservoir is usually located in the bottom of the food storage chamber and communicates with the chamber so that water vapor can be selectively supplied to the chamber as needed by the dynamics of the process. However it is not necessary that the reservoir be located in the bottom of the chamber.

Also within the scope of the present invention it has been found that there may be excessive moisture in the air from loss of excess moisture from the food which increases the moisture content and temperature in the chamber which is undesirable in some instances such as where food is intended to remain "crispy" and moisture lost from the inside of the food or from other food stored in the chamber increases the moisture content in the chamber above the level which would be maintained by vaporization from the reservoir. Some of the excess moisture condenses in the water in the reservoir and raises the reservoir temperature. If the moisture is not removed, a new "pseudo" equilibrium is established with the vapor content above the level which would otherwise be maintained by the control system.

In such instances the desired food character such as crispness may deteriorate as the temperature of the water in the reservoir increases above the desired control range.

In accordance with one feature of the present invention, it has been unexpectedly found that, by providing a surface to condense moisture from the air, the quality of the food in storage can be significantly improved.

Within the scope of the present invention, several means can be utilized to condense the excess moisture. In one instance, the excess moisture is condensed by supplying ambient air over a portion of the surface of the reservoir so that the heater and control in the chamber can maintain control. Other means can also be provided to condense the moisture.

Examples of arrangements within the scope of the present invention are illustrated in the accompanying drawings and discussed hereinafter, but it will be understood that neither the illustrations nor the descriptions are by way of limitation and that other arrangements also within the scope of the present invention will occur to those skilled in the art upon reading the disclosures set out hereinafter.

BRIEF DESCRIPTION OF THE DRAWINGS

Examples of arrangements within the scope of the present invention are illustrated by the accompanying drawings where.

DETAILED DESCRIPTION OF THE DRAWINGS

Figure 1:
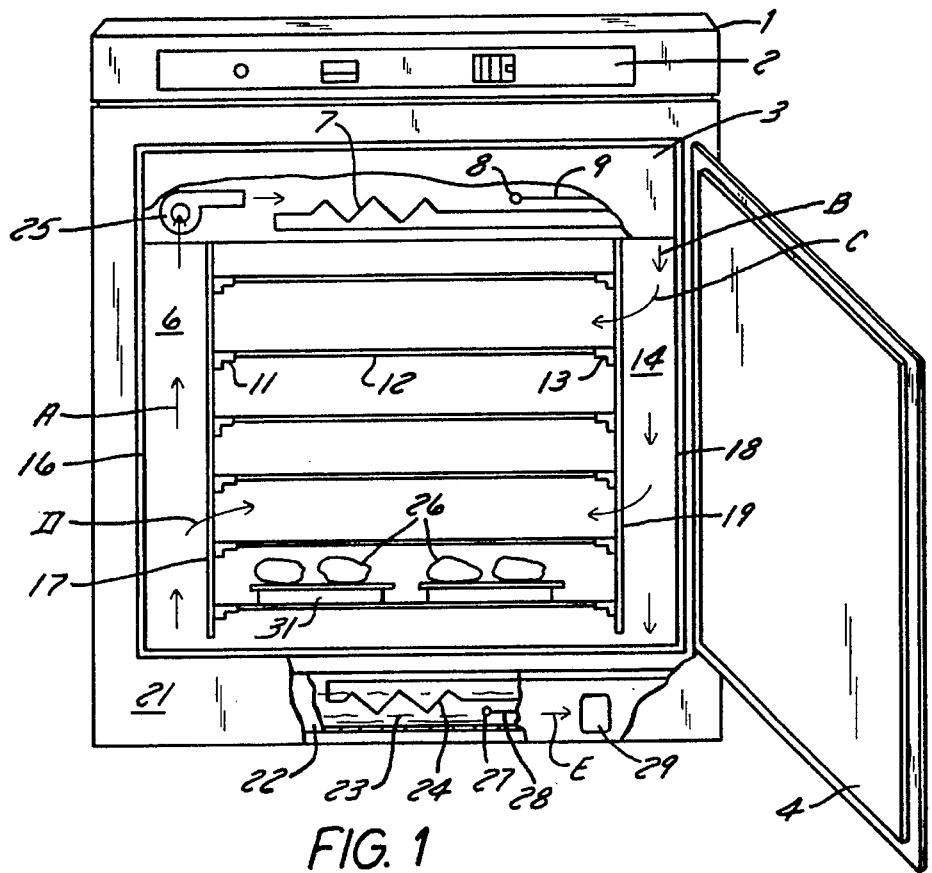
FIG. 1 is a front view partially in cross-section of an example of an apparatus in accordance with the present invention.

FIG. 1 is a front elevational view partially in cross section of an example of an arrangement within the scope of the present invention. Briefly, a cabinet 1 is provided to define a chamber 3 to hold product in accordance with the present invention.

In the arrangement shown in FIG. 1, the processing chamber is defined between internal walls 17 and 19. An air heater 7 is located as shown in a plenum to heat the air in the enclosure but it will be understood that the heater can be located wherever it will serve to heat air in the chamber. Wall 17 with perforations (not shown) defines an air flow path 6 as shown to conduct air to a blower or circulating fan 25 which circulates air through the chamber.

As shown in FIG. 1, internal wall or baffle 17 can be perforated so that air stream D flows therethrough and over food stored in the unit which is located on shelves 12 retained on the walls 17 and 19 by brackets 11 and 13 as shown.

Also within the scope of the present invention a water reservoir 22 is located in the bottom of the enclosure as shown in FIG. 1 and described hereinafter.

A heater 24 is located in the reservoir and heated to selected temperatures so that water is vaporized at selected rates to the air carried over reservoir 22 and to plenum 6 where part of the air passes to fan 25 and part to the chamber by means of the apertures in walls 17 and 19.

In general, the air stream is cycled to and from the food holding portion of chamber 1 at a selected rate necessary to maintain desired conditions within the chamber.

A door 4 is provided on the cabinet to close chamber 1 against loss of heated air and water vapor so that equilibrium conditions can be maintained in the enclosure.

Figure 2:
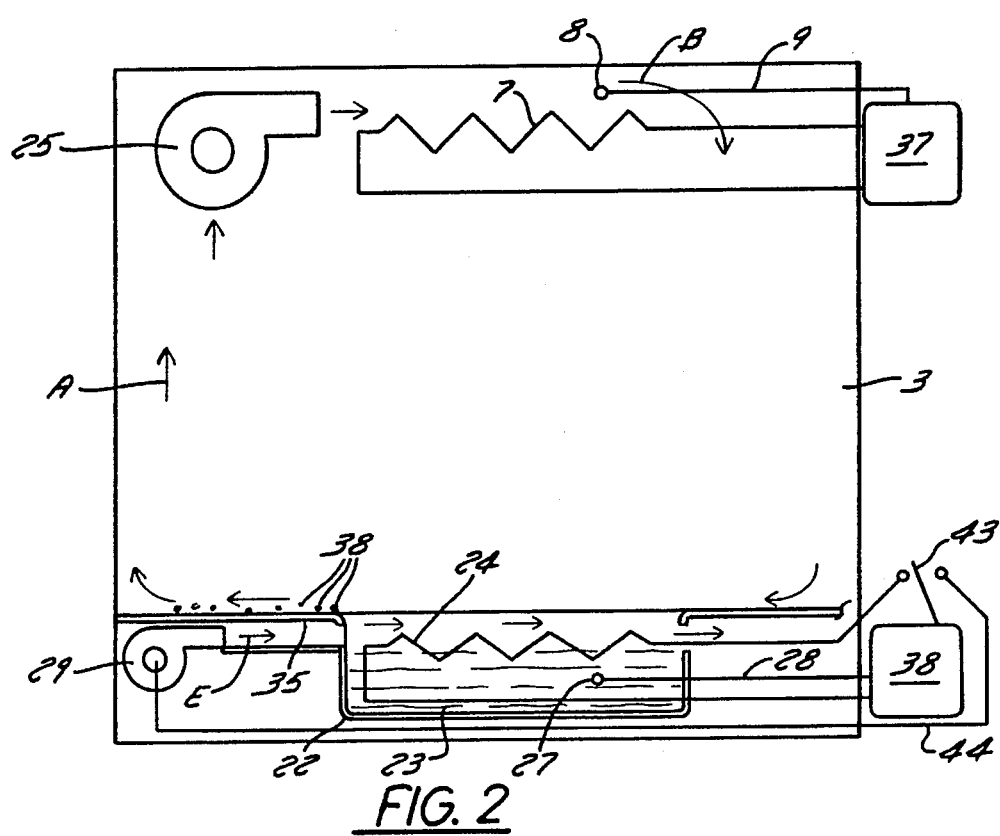
FIG. 2 is an elevational schematic view of one example of an apparatus within the scope of the present invention as shown in FIG. 1.

In accordance with one feature, a controller 37 is provided as shown in the schematic of FIG. 2 to provide energy to maintain the temperature of the air at a selected level. The air temperature is sensed by a sensor 8 and is transmitted to the controller 37 as is known in the art. In general, the air temperature is maintained at a level above the temperature of the water in reservoir 22 so that a selected water vapor content is maintained in the air stream exposed to the food in the chamber. Reservoir 22 also shown in the arrangement shown in FIG. 1 is adapted to hold a supply of water 23 and a heater 24, for example an electrical heater powered by a control circuit as shown in FIG. 2 is located within the reservoir to evaporate water from the reservoir at a rate determined by the temperature of the water.

A temperature measuring device 27 such as a thermocouple, resistance temperature detector or thermistor is located within the reservoir 22 to generate a signal which indicates the reservoir water temperature.

Energy supply to the heater 24 is controlled by a controller 38 to maintain the water temperature at selected levels.

The air and water temperatures are controlled to maintain selectively variable conditions within the chamber for storing food where the absolute and differences between the temperatures are determined by the characteristics of the food product to be stored.

Maintenance of the temperature differential is important. It has been found that, in some circumstances, the moisture content, temperature and characteristics of heated food product placed in the enclosure supply sufficient heat and moisture so that the temperature and vapor content of the food is sufficient to increase the vapor content in the chamber to adverse levels for maintenance of food quality, and, in some instances, the heat causes the temperature of the water in the reservoir to increase without heat being supplied to the reservoir from the heater, and, in some cases, the air temperature also increases so that the system is essentially out of control. In these cases, the food quality suffers and, in some cases, cannot be corrected.

In accordance with one feature of the present invention, it has been found that, by providing a condensing surface within the enclosure, the excess moisture and heat can be controlled, and the air and water temperature control maintained so that the food quality can be maintained.

In FIGS. 1 and 2, a blower 29 is provided to direct an ambient air stream E through an inlet opening provided in reservoir wall 22 and over the water in the reservoir and out an opening on the side opposite the inlet so the surface of the water in the reservoir is cooled and provides a condensing surface for removal of excess water/heat from the system and the temperature of the water in the reservoir is maintained within control range.

The ambient, relatively cool, air can also cool the bottom of the chamber adjacent the reservoir 22 where excess moisture condenses as droplets 38 which return to the reservoir. The air stream provides the cooling required to maintain the necessary air and water temperatures.

As shown, controllers 37 and 38 are provided to control air and water temperatures by means of heaters 7 and 24. In the case of the arrangement shown in FIG. 2, controller 38 operates a switch 43, which supplies power to heater 24 as needed to heat the water in reservoir 22, and has a default position where the switch is closed through lead 44 to fan 29 to supply the cooling air stream. FIG. 2 illustrates one cooling configuration within the scope of the present invention, and there are other configurations within the scope of the present invention, another example of which is illustrated in FIG. 4 and described hereinafter.

Figure 3A:
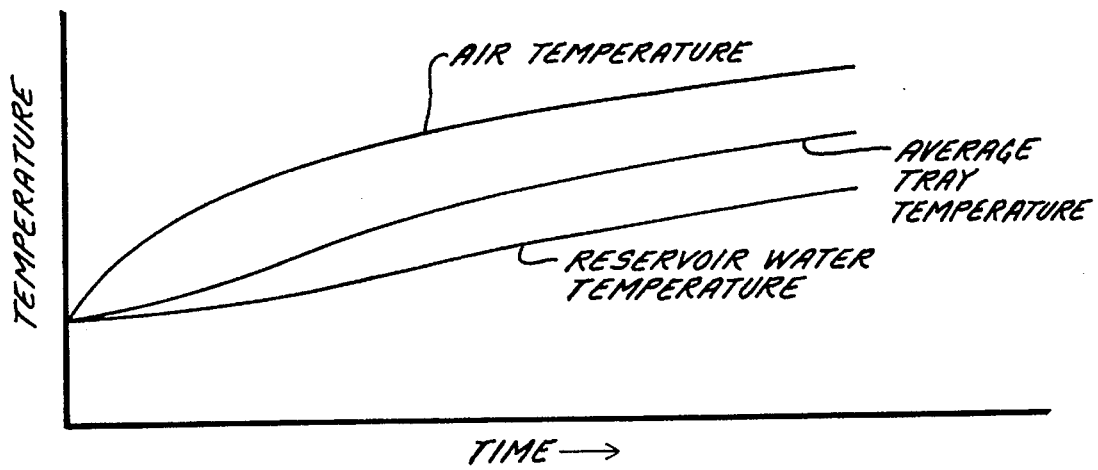
FIGS. 3A and 3B illustrate the beneficial effects of devices within the scope of the present invention.
Figure 3B:
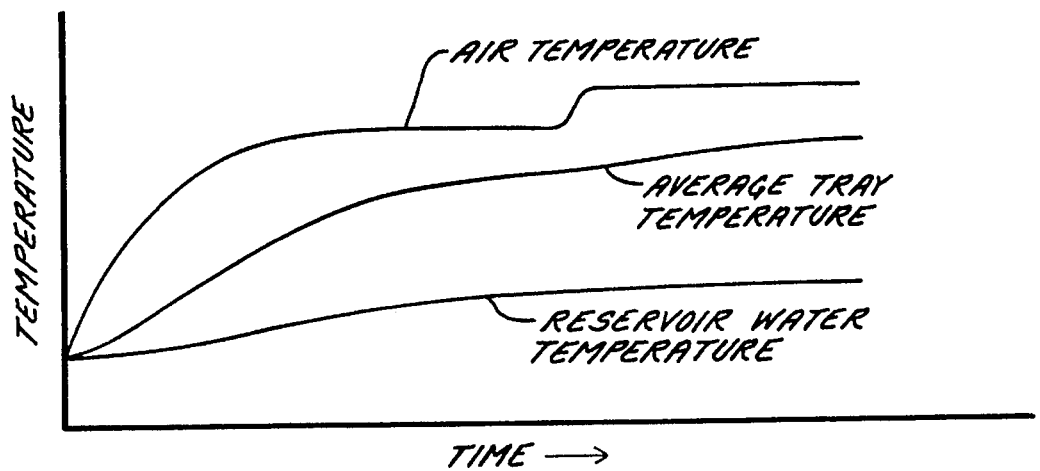
Figure 4:
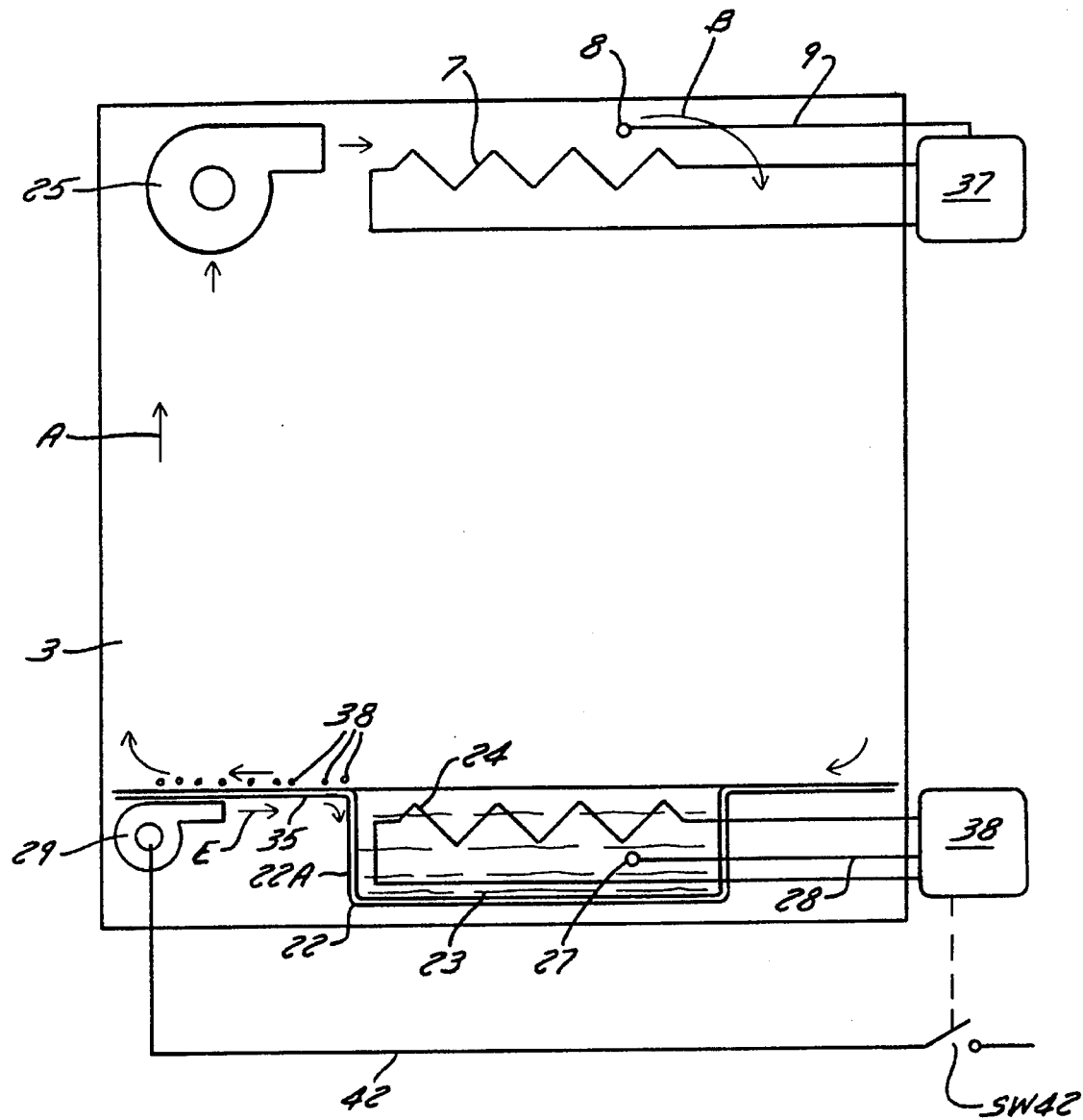
FIG. 4 is a cross-sectional illustration of another arrangement within the scope of the present invention.

The effect of the operation of devices of the type shown in FIGS. 2 and 4 is illustrated in FIGS. 3A and 3B. The data illustrated in FIG. 3A results from an arrangement where a cooling surface is not provided and the air temperature is gradually increased but it is desired to maintain the water temperature constant. As shown, after an initial period where water temperature is relatively constant, the heat in the chamber is transferred to the water, and the water temperature increases without adding heat to the reservoir. This then increases the water content of the air stream above the desired level and leads to deterioration of the quality of the stored food.

FIG. 3B illustrates a system where a condensing surface as illustrated in FIGS. 2 and 4 is provided. In this case, the temperature of the air is increased stepwise. The temperature on the trays follows the air temperature, but the water temperature remains relatively constant as referenced to the system shown in FIG. 3A, and the average temperature on the trays is stabilized so that the water content in the enclosure can be controlled and the quality of the food product stored therein maintained.

FIG. 4 illustrates another example of an arrangement within the scope of the present invention where the side 22A of the reservoir 22 is used as a cooling or condensing surface and the fan 29 directs an ambient air stream E against the side 22A of the reservoir and the bottom surface of the chamber 3 to provide cooling to the water in the reservoir to maintain control of the system as previously described.

An example of a different control system is also provided in the example of FIG. 4 where controller 38 controls a power lead to fan 29 by means of a switch SW42. Controller 38 is adapted to operate switch SW42 whenever the temperature in reservoir 22 exceeds a preset maximum temperature to cool the water in the reservoir.

It will be understood that the foregoing are but a few examples of arrangements within the scope of the present invention and that other arrangements also within the scope of the present invention will occur to those skilled in the art upon reading the disclosure set forth hereinbefore.

What is claimed is:

1. An apparatus, comprising:

a food receiving chamber including a heat source;

a water reservoir including a heat source;

an air flow path between said food receiving chamber and said water reservoir, wherein the air flowing along said air flow path contains moisture;

a circulating fan for circulating air along said air flow path; and an ambient air fan for blowing ambient air onto said water reservoir in order to reduce the temperature of said water reservoir and cause some of the moisture in said air flow path to condense.

2. An apparatus as recited in claim 1, wherein said food receiving chamber includes a wall, and wherein said ambient air fan also blows ambient air on the outside of said wall.

3. An apparatus as recited in claim 1, and further comprising:

a temperature sensor in said food receiving chamber;

a humidity sensor in said food receiving chamber; and a controller which controls said heat sources and said fans in order to maintain the desired temperature and humidity in said food receiving chamber.

* * * * *